(12) United States Patent
Clark

(10) Patent No.: US 7,710,820 B2
(45) Date of Patent: May 4, 2010

(54) SEABED SEISMIC SOURCE APPARATUS

(75) Inventor: Brian Clark, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 589 days.

(21) Appl. No.: 11/458,265

(22) Filed: Jul. 18, 2006

(65) Prior Publication Data

US 2007/0039776 A1 Feb. 22, 2007

Related U.S. Application Data

(60) Provisional application No. 60/709,871, filed on Aug. 19, 2005.

(51) Int. Cl.
*G01V 1/38* (2006.01)

(52) U.S. Cl. .................... 367/23; 367/15; 181/118; 181/120

(58) Field of Classification Search .......... 367/15, 367/23; 181/118, 120
See application file for complete search history.

(56) References Cited

U.S. PATENT DOCUMENTS

| | | | |
|---|---|---|---|
| 4,065,747 A * | 12/1977 | Patten et al. ............... 367/133 |
| 4,300,654 A | 11/1981 | Raymond et al. |
| 5,113,377 A * | 5/1992 | Johnson ...................... 367/20 |
| 5,189,642 A * | 2/1993 | Donoho et al. ............... 367/15 |
| 5,257,241 A * | 10/1993 | Henderson et al. .......... 367/15 |
| 5,770,945 A | 6/1998 | Constable |
| 6,175,809 B1 * | 1/2001 | Naville ....................... 702/14 |
| 6,308,137 B1 | 10/2001 | Underhill et al. |
| 7,535,800 B2 * | 5/2009 | Sanders et al. ............. 367/146 |
| 2005/0169713 A1 * | 8/2005 | Luc et al. ................... 405/166 |
| 2006/0195263 A1 * | 8/2006 | Meinig et al. ................ 702/3 |
| 2006/0256651 A1 * | 11/2006 | Sanders et al. ............... 367/15 |

OTHER PUBLICATIONS

Sonardyne, Marine Seismic Product Guide, "Positioning, Navigation and Asset Tracking System," product guide, pp. 6-7, 10-11, rear cover.
Herber et al., Marine Geophysical Researches, v. 20, pp. 239-247, "An Implosive Seismoacoustic Source for Seismic Experiments on the Ocean Floor," Kluwer Academic Publishers, The Netherlands (1998).
Sonardyne, Sonardyne Oceanographic Systems, "Acoustic Release Transponders," product guide, pp. 1-5 and rear cover.
Sonardyne, Coastal Acoustics, Coastal Acoustics Product Guide Underwater Positioning, Navigation and Control Systems, product guide, Jul. 2005.

* cited by examiner

*Primary Examiner*—Scott A Hughes
(74) *Attorney, Agent, or Firm*—Darla Fonseca; Brigitte Echols; Charlotte Rutherford

(57) ABSTRACT

A seabed seismic source apparatus includes a control module adapted for deployment at a seabed. The control module has a receiver for receiving a remote signal and a firing controller for generating a firing signal in response to the remote signal. The seabed seismic source apparatus further includes at least one seismoacoustic source module adapted for deployment at the seabed with the control module. The seismoacoustic source module has a seismoacoustic source for generating a seismic signal and a firing device for firing the seismoacoustic source to generate the seismic signal. The seabed seismic source apparatus further includes a transmission link between the firing controller and the firing device, wherein the firing device fires the seismoacoustic source upon receiving the firing signal generated by the firing controller.

36 Claims, 4 Drawing Sheets

SEABED SEISMIC SOURCE APPARATUS

CROSS-REFERENCE TO RELATED APPLICATIONS

This application claims priority, under 35 U.S.C. §119, to Provisional Patent Application Ser. No. 60/709,871, filed on Aug. 19, 2005.

BACKGROUND OF THE INVENTION

The invention relates generally to seismic exploration in and/or around a well drilled for hydrocarbon exploration and production. More specifically, the invention relates to methods and systems for acquiring seismic data in a marine environment.

Seismic data is collected to analyze subsurface properties and is particularly collected in connection with hydrocarbon exploration and production activities. Seismic data for analyzing subsurface formations may be collected on land or in water. Seismic data is acquired using explosive, vibratory, or impulsive seismoacoustic sources. An example of an impulsive seismoacoustic source is an air gun, which is used to release highly compressed air into water. Vibratory seismoacoustic sources are typically used on land when explosive seismoacoustic sources cannot be used. Seismoacoustic source signals are reflected by geological layers beneath the earth surface, and the reflections are detected by seismoacoustic receivers, such as geophones on land and hydrophones in water. The reflected signals are recorded and analyzed to derive an indication of the geology in the subsurface. Such indications may be used to assess the likelihood and location of potential hydrocarbon deposits.

Seismic data can be collected while drilling a well using measurement-while-drilling (MWD)/logging-while-drilling (LWD) seismic systems. Conventional MWD/LWD seismic systems, such as described in U.S. Pat. No. 6,308,137, are generally configured with a seismic tool located near the drill bit, where the seismic tool contains seismoacoustic receivers for recording the arrival of seismoacoustic source signals sent from seismoacoustic sources at the surface. In offshore operations, the surface seismoacoustic sources are typically air guns. If the well is vertical, then the drilling platform provides a suitable base for the air gun and its associated surface equipment. If the well is highly deviated or extended-reach, the air gun must be deployed from a vessel to locate it directly above the drill bit. The vessel has to be available during the entire drilling process since seismic data are acquired at specific intervals in the drilling operation. Maintaining a vessel and crew offshore adds considerable expense and complexity to seismic jobs.

From the foregoing, there continues to be a desire to improve the efficiency and cost of running seismic jobs in a marine environment.

SUMMARY OF THE INVENTION

In one aspect, the invention relates to a seabed seismic source apparatus which comprises a control module adapted for deployment at a seabed. The control module has a receiver which receives a remote signal and a firing controller which generates a firing signal in response to the remote signal. The seabed seismic source apparatus further includes at least one seismoacoustic source module adapted for deployment at the seabed with the control module. The seismoacoustic source module has a seismoacoustic source which generates a seismic signal and a firing device which fires the seismoacoustic source to generate the seismic signal. The seabed seismic source apparatus further includes a transmission link between the firing controller and the firing device, wherein the firing device fires the seismoacoustic source upon receiving the firing signal through the transmission link.

In another aspect, the invention relates to a marine seismic data acquisition system which comprises a control module deployed at a seabed. The control module has a receiver which receives a remote signal and a firing controller which generates a firing signal in response to the remote signal. The marine seismic data acquisition system further includes at least one seismoacoustic source module deployed at the seabed with the control module. The seismoacoustic source module has a seismoacoustic source which generates a seismic signal and a firing device which fires the seismoacoustic source to generate the seismic signal. The marine seismic data acquisition system further includes a transmission link between the firing controller and the firing device, wherein the firing device fires the seismoacoustic source upon receiving the firing signal through the transmission link. The marine seismic data acquisition system further includes a transmitter coupled to a structure at a surface of the sea which sends the remote signal to the control module.

In yet another aspect, the invention relates to a method of acquiring seismic data in a marine environment which comprises deploying one or more seabed seismic source apparatus along a planned trajectory of a well, where each seabed seismic source apparatus comprises a control module, a seismoacoustic source module, and a transmission link between the control module and the seismoacoustic source module. The method further includes transmitting a remote signal from a surface of the sea to a control module, receiving the remote signal at a receiver in the control module, generating a firing signal at a firing controller in the control module and transmitting the firing signal to the seismoacoustic source module, receiving the firing signal at a firing device in the seismoacoustic source module, firing a seismoacoustic source in the seismoacoustic source module to generate a seismic signal, and detecting the seismic signal.

Other features and advantages of the invention will be apparent from the following description and the appended claims.

BRIEF DESCRIPTION OF THE DRAWINGS

The accompanying drawings, describe below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

Figure 1:
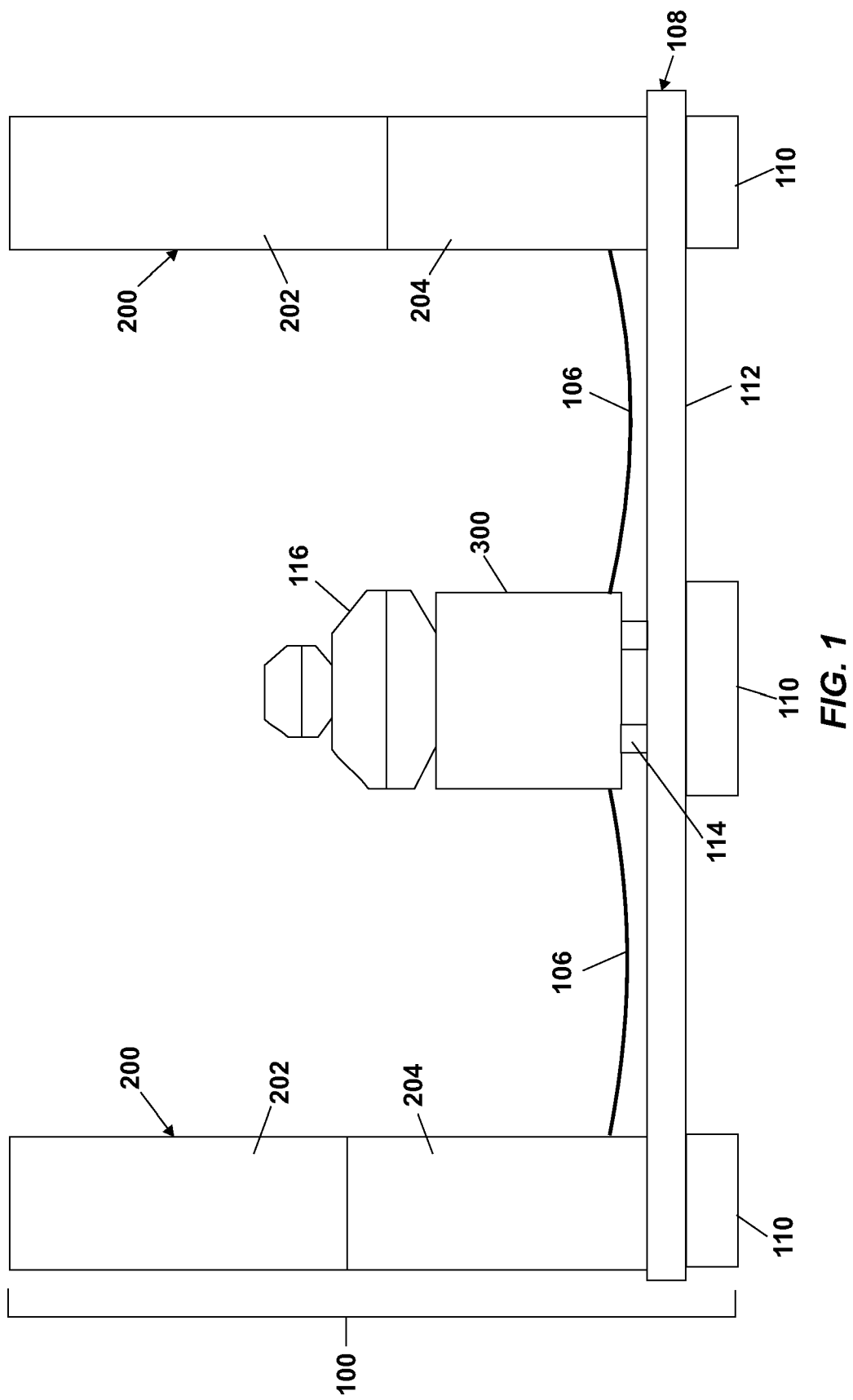
FIG. 1 is a schematic of a seabed seismic source apparatus.

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

FIG. 1 depicts a seabed seismic source apparatus 100 that can be deployed at a seabed and remotely controlled to generate seismic signals at seabed. The seabed seismic source apparatus 100 includes one or more seismoacoustic source modules 200 and a control module 300. The control module 300 is coupled to the seismoacoustic source modules 200 so that it can be deployed simultaneously with the seismoacoustic source modules 200. The control module 300 may be coupled to the seismoacoustic source modules 200 using cables 106. The cables 106 also provide transmission links between the control module 300 and the seismoacoustic source modules 200. An anchor system 108 is coupled to the seismoacoustic source modules 200 and the control module 300. The anchor system 108 may be anchor weights 110 attached to a platform 112 on which the seismoacoustic source modules 200 and the control module 300 are mounted. Alternatively, the anchor system 108 may be anchor weights 110 attached directly to the seismoacoustic source modules 200 and the control module 300. The anchor weights 110 ensure that the seabed seismic source apparatus 100 will sink when dropped into a deep body of water. The anchor weights 110 may be concrete or metal. Where the control module 300 and the seismoacoustic source modules 200 are mounted on the platform 112, desired spacing between the seismoacoustic source modules 200 and the control module 300 can be assured. Where the platform 112 is not used, the cables 106 should be sufficiently long to allow the seismoacoustic source modules 200 and the control module 300 to descend at slightly different rates and land a short distance apart. The control module 300 may be coupled to the anchor system 108 using a releasable device 114. Such releasable devices are available from Sonardyne International, UK. A flotation device 116 may be coupled to the control module 300 so that the control module 300 when released from the platform 112 can float to the surface and be recovered.

Figure 2:
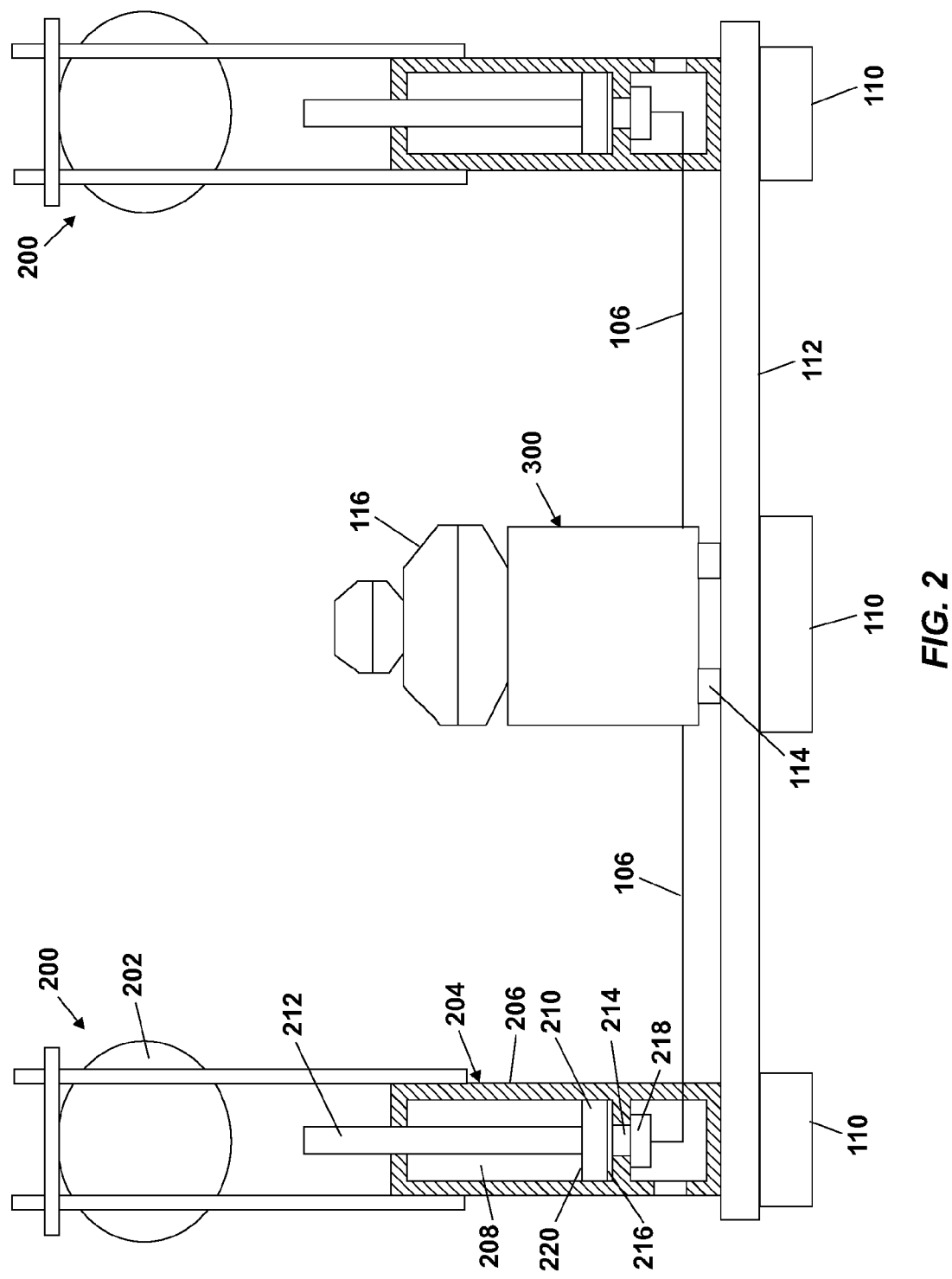
FIG. 2 is a more detailed view of a seabed seismic source apparatus.

The seismoacoustic source module 200 includes a seismoacoustic source 202 and a firing device 204 for firing the seismoacoustic source 202. The seismoacoustic source 202 may be an explosive device or an implosive device. Explosive and implosive seismoacoustic sources are known in the art. An explosive seismoacoustic source 202 would include an explosive material, and the firing device 204 would be a detonator for firing the explosive material. For illustration purposes, FIG. 2 shows the seismoacoustic source 202 implemented as an implosive vessel, such as an air-filled glass sphere, such as described in U.S. patent application Ser. No. 11/127,014, the content of which is incorporated herein by reference. However, the implosive vessel need not be made of glass. It could be made of other materials such as fiberglass and composites, for example. Further, the implosive vessel can have other shapes besides spherical. The firing device 204 in this example is designed to fracture the implosive vessel 202. For example, the firing device 204 may include a cylinder 206 having a chamber 208 in which a piston 210 is disposed. A shaft 212 is attached to the piston 210 and extends out of the cylinder 206. The chamber 208 is initially at a pressure that is lower than the pressure at the seabed, for example, atmospheric pressure. The cylinder 206 includes an orifice 214 through which the pressure at seabed can be communicated to the side 216 of the piston 210. A valve 218 is mounted at the orifice 214 and is normally closed. The valve 218 is triggered to the open position in response to a signal from the control module 300 so that the pressure at the seabed is communicated to the side 216 of the piston 210, while the side 220 of the piston 210 is exposed to the initial pressure in the chamber 208. The pressure differential created across the piston 210 then extends the shaft 212 to fracture the air-filled glass sphere. However, the invention is not limited to this method of fracturing an air-filled glass sphere. What is important is that the firing device 204 operates in response to commands from the control module 300. Other methods of fracturing an implosive vessel such as an air-filled glass sphere are taught in, for example, U.S. patent application Ser. No. 11/127,014.

Figure 3:
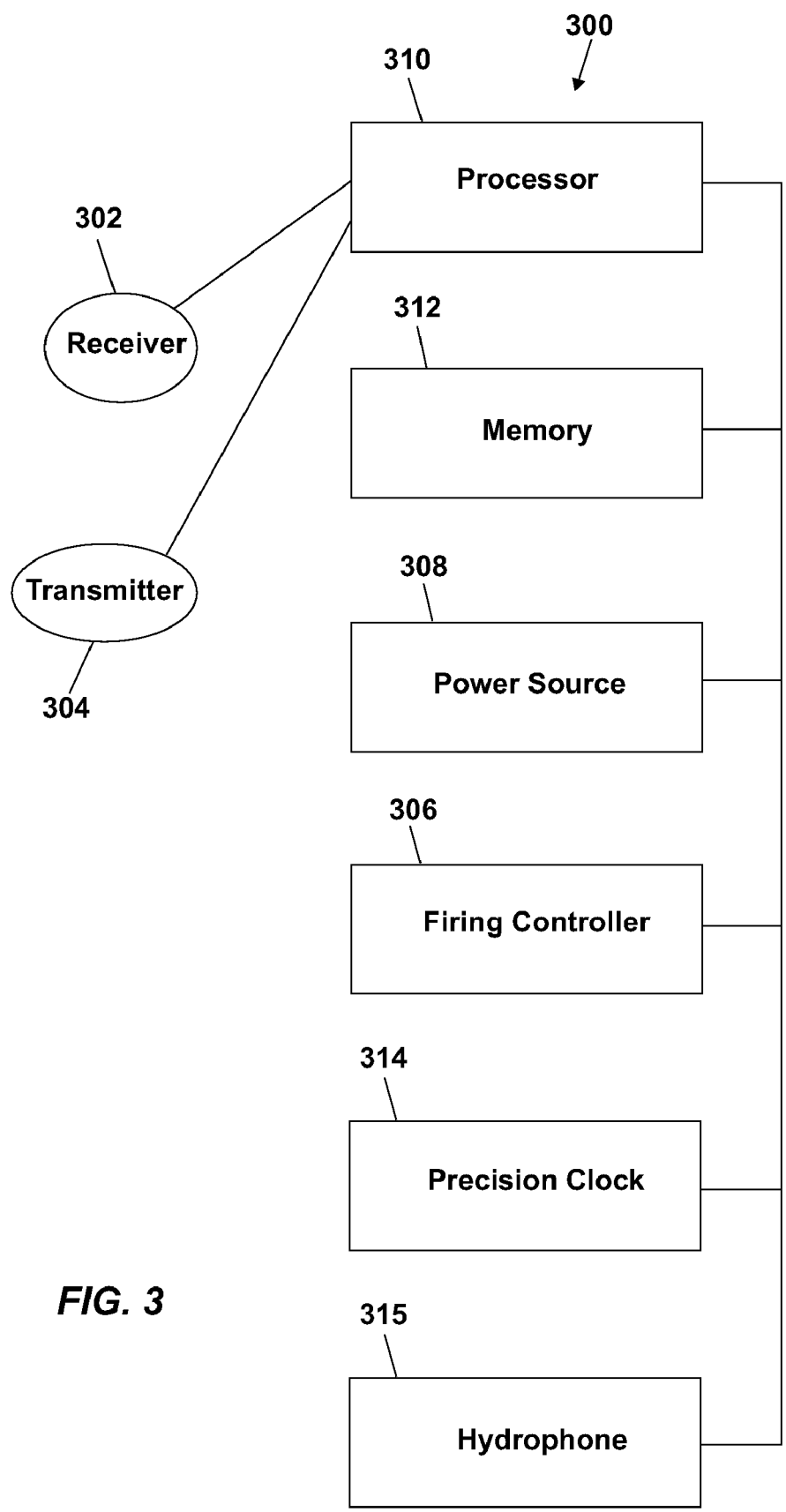
FIG. 3 is a block diagram of a control module for initiating firing of a seismoacoustic source.

FIG. 3 shows a block diagram of the control module 300. The control module 300 includes a receiver 302 for receiving signals from an external source. In one example, the receiver 302 is an acoustic receiver. The control module 300 may also include a transmitter 304 for sending signals to an external location. The receiver 302 and transmitter 304 may be provided by a transponder. Underwater acoustic transponders that include transmitter and receivers are available from Sonardyne International, UK. The control module 300 includes a firing controller 306 for generating a firing signal, which is sent to the firing device (204 in FIGS. 1 and 2) in the seismoacoustic source modules (200 in FIGS. 1 and 2). For example, the firing controller 306 may send an electrical signal to the firing device (204 in FIG. 2), which would activate the valve (218 in FIG. 2) to the open position so that pressure at the seabed can be communicated to the piston (210 in FIG. 2) in the cylinder (206 in FIG. 2). In general, the signal generated by the firing controller 306 would be tailored to the mechanism by which the firing device 204 operates. The control module 300 includes a power source 308, such as a battery. The control module 300 includes a processor 310 for processing received and transmitted signals. The control module 300 may further include internal memory 312 for storing data. The control module 300 may further include a precision clock 314 to measure the time that the seismoacoustic source (202 in FIGS. 1 and 2) is fired. The control module 300 may further include a hydrophone 315 to measure the signature of the seismic signal generated by the seismoacoustic source. It is well known in the art that recording the source signature is useful for processing seismic data. The components of the control module 300 are mounted in a sonde or casting suitable for use in a marine environment.

The control module 300 may perform various functions. The control module 300 may be used to determine its position on the seabed using the receiver 302 and transmitter 304. Because the seabed seismic source apparatus (100 in FIG. 1) may be deployed from a vessel and allowed to the freefall to the seabed, it may not land exactly under the vessel. In this case, acoustic signals sent between the seabed seismic source apparatus and the vessel can be used to locate the exact position of the seabed seismic source apparatus. Surface and subsea equipment for acoustic transmission and triangulation are available from Sonardyne International, UK. The control module 300 listens for firing command from the surface. The control module 300 initiates firing of the seismoacoustic source (202 in FIGS. 1 and 2). The control module 300 may record the source signature waveform measured with the hydrophone 315 and the time of firing in memory 312 and may transmit the waveform and time of firing to the surface. A single control module 300 can be used to fire multiple seismoacoustic sources (202 in FIGS. 1 and 2). The control module 300 may listen for a recover command from the surface. Upon receiving the recover command, the control module 300 may release the releasable device (114 in FIG. 1), float to the surface, and be recovered.

Figure 4:
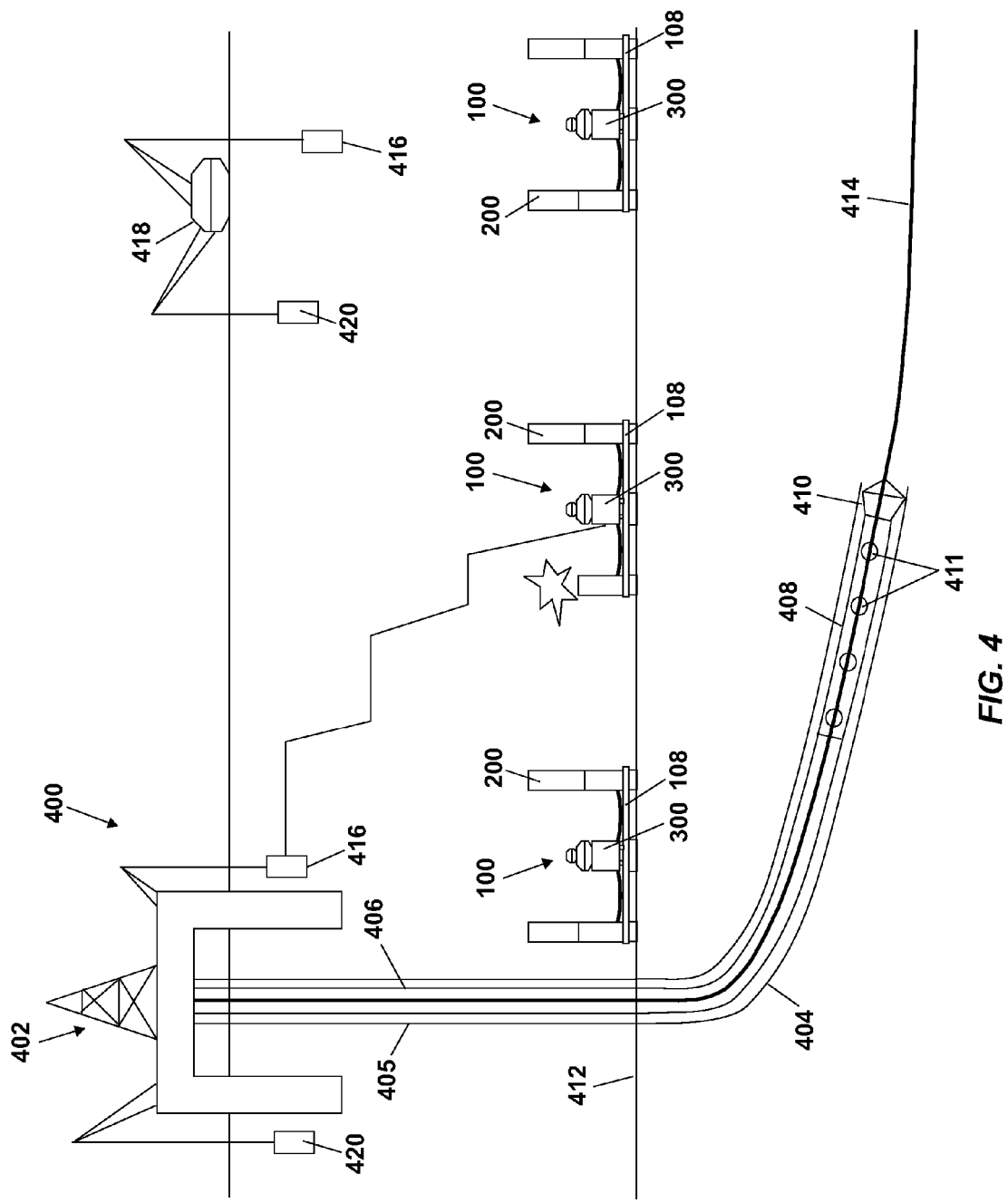
FIG. 4 shows a marine seismic data acquisition system.

FIG. 4 shows an example of a marine seismic data acquisition system 400. The system 400 includes an offshore rig 402 position over a subsea well 404. A marine riser 405 may connect the offshore rig 402 to the subsea well 404. The offshore rig 402 supports a drill string 406 that includes a seismic tool 408, such as a seismic MWD/LWD tool, adjacent to a drill bit 410. The seismic tool 408 includes an array of seismoacoustic receivers 411. The drill string 406 extends into the subsea well 404. A series of the seabed seismic source apparatus 100 is deployed at the seabed 412 along a planned trajectory 414 of the well 404. A transponder 416 is hung off the offshore rig 402 for sending commands to the control modules 300 of the seabed seismic source apparatus 100 and for receiving signals from the control modules 300. The transponder 416 may consist of an acoustic transmitter and receiver. Such transponders are available from Sonardyne International, UK. For the control modules 300 located very far from the offshore rig 402, the transponder 416 may be hung off a surface buoy 418 that is positioned generally above the control module 300. Commands can then be sent from the offshore rig 402 to the transponder 416 on the surface buoy 418 through any suitable means, such as an electromagnetic link. The transponder 416 on the surface buoy 418 can then send the received command to the desired control module 300. The transponder 416 may be near the surface of the sea or may be lowered to the seabed 412 from a structure at the surface of the sea, such as the offshore rig 402 or surface buoy 418. Hydrophones 420 may be suspended from the rig 402 or the surface buoy 418 to measure the seismic signal from a seismoacoustic source 202. The distance between a seabed seismic source apparatus 100 and the rig 402 or surface buoy 418 is known, and the acoustic velocity in water can be determined. Hence, the seismic signal received by a hydrophone 420 can be used to determine the exact time when the seismoacoustic source 202 was fired. This is important since one goal is to measure the time it takes for the seismic signal or wave to reach the seismic tool 408. The invention is not limited to use of a seismic tool in a drill string to detect reflection of seismic signals or waves during drilling. For example, a wireline tool carrying seismoacoustic receivers may be disposed in the subsea well 404 to detect reflection of seismic signals or waves after drilling. Alternatively, permanent seismoacoustic receivers may be installed in the subsea well 404 to detect reflection of seismic signals or waves after completion.

In one example, a method of acquiring seismic data includes using a vessel (not shown) to drop a series of seabed seismic source apparatus 100 along a planned trajectory 414 of a subsea well 404 from the surface, where the seabed seismic source apparatus 100 sink to the seabed 412. The vessel may include instrumentation for determining the position of the seabed seismic source apparatus 100 after dropping them, including global positioning system (GPS) and acoustic transponders used for triangulation. In a relatively short time, the vessel can deploy many seabed seismoacoustic source apparatus 100 and then return to base. In an MWD seismic process, a section of the well 404 is drilled. Then drilling is topped to add new drill pipe to the drill string 406. While there is a brief lull in drilling, a command is sent from the surface to the control module 300 in the zone above which the drill bit 406 or seismoacoustic receivers 411 are located. The control module 300 upon receiving the command sends a signal to the firing device of the desired seismoacoustic source module 200, and the firing device fires the seismoacoustic source. Hydrophones 420 on the offshore rig 402 or on the surface buoy 418 sense the seismic wave that travels directly through the water. The exact time the seismic source was fired can be determined from the known distance between the seismoacoustic source 202 and the hydrophone 420. Alternatively, a precision clock on the seabed seismoacoustic apparatus 100 can record the time of firing and transmit this information to the rig 402 or buoy 418. The seismoacoustic receivers 411 in the seismic tool 408 detect and record seismic waves that travel through the subsurface formations. The seismic tool 408 determines arrival time of the seismic waves and transmits the arrival time, and optionally the waveforms, to the surface via MWD telemetry. The surface MWD system receives the time/waveform data uses it to determine the location of the drill bit 410 on the surface seismic data. The lull in drilling typically lasts 3 to 5 minutes when the seismic measurement can be made. Then, drilling of the next section of well 404 continues and may last one or more hours before the next drilling pause. A vessel may be used to drop an additional number of seabed seismic source apparatus 100 as needed. After firing the seismoacoustic sources coupled to a particular control module 300, a recover command may be sent to the control module 300 which would allow the control module 300 to release itself from the anchor system 108 and float to the surface where it can be recovered by the vessel.

From the foregoing, a large number of seabed seismic source apparatus can be quickly deployed from a vessel from a vessel along a planned trajectory of a subsea well and quickly recovered. This eliminates the need for the vessel to remain onsite during lengthy drilling operations, making running seismic jobs more efficient and less costly. In addition, this reduces safety risks inherent in maintaining a crewed vessel offshore for a prolonged time. The seismoacoustic sources deployed at seabed can be fired on demand, for example, during the brief drilling pauses. The control module contains the mechanisms necessary to receive commands from the surface of the sea and initiate firing of seabed seismoacoustic sources. Commands can be sent to the control module through a wireless link, such as an acoustic link. The ability to fire the seismoacoustic sources on demand provides greater control over when seismic data are acquired. Seabed seismoacoustic sources can produce shockwaves having significant energies at seismic frequencies. Because the source is located on the seabed, typically several thousand feet below the surface of the sea, reflections from the air-water interface are reduced and multi-path effects are less problematic.

While the invention has been described with respect to a limited number of embodiments, those skilled in the art, having benefit of this disclosure, will appreciate that other embodiments can be devised which do not depart from the scope of the invention as disclosed herein. For example, a non-drilling vessel could be equipped with transponders 416 or hydrophones 420 and used in conjunction with a permanently deployed seismic array.

What is claimed is:

1. A seabed seismic source apparatus, comprising:
   a control module adapted for deployment at a seabed, the control module having a receiver which receives a remote signal and a firing controller which generates a firing signal in response to the remote signal;
   at least one seismoacoustic source module adapted for deployment at the seabed with the control module, the seismoacoustic source module having a seismoacoustic source which generates a seismic signal and a firing device which fires the seismoacoustic source to generate the seismic signal;
   a transmission link wherein signals travel through a body of water between the firing controller and the firing device, wherein the firing device fires the seismoacoustic source upon receiving the firing signal through the transmission link; and means for determining a travel time of the firing signal through the water.

2. The seabed seismic source apparatus of claim 1, wherein the seismoacoustic source generates the seismic signal by implosion.

3. The seabed seismic source apparatus of claim 1, wherein the seismoacoustic source generates the seismic signal by explosion.

4. The seabed seismic source apparatus of claim 1, wherein the receiver is an acoustic receiver.

5. The seabed seismic source apparatus of claim 1, wherein the control module further includes a transmitter for transmitting signals to a remote location.

6. The seabed seismic source apparatus of claim 5, wherein the transmitter is an acoustic transmitter.

7. The seabed seismic source apparatus of claim 1, wherein the control module further includes a precision clock for determining time of firing of the seismoacoustic source.

8. The seabed seismic source apparatus of claim 1, wherein the control module further includes a processor for processing commands.

9. The seabed seismic source apparatus of claim 1, wherein the control module further includes memory for storing data.

10. The seabed seismic source apparatus of claim 1, further comprising an anchoring system for anchoring the control module and the seismoacoustic source module to the seabed.

11. The seabed seismic source apparatus of claim 10, wherein the control module is releasably coupled to the anchor system.

12. The seabed seismic source apparatus of claim 11, further comprising a floatation device coupled to the control module to allow the control module to float to the surface of the water when released.

13. The seabed seismic source apparatus of claim 1, wherein the control module further comprises a hydrophone for measuring a signature of the seismic signal.

14. A marine seismic data acquisition system, comprising:
a control module deployed at a seabed, the control module having a receiver which receives a remote signal and a firing controller which generates a firing signal in response to the remote signal;
at least one seismoacoustic source module deployed at the seabed with the control module, the seismoacoustic source module having a seismoacoustic source which generates a seismic signal and a firing device which fires the seismoacoustic source to generate the seismic signal;
a transmission link wherein signals travel through a body of water between the firing controller and the firing device, wherein the firing device fires the seismoacoustic source upon receiving the firing signal through the transmission link;
a transmitter coupled to a structure at the surface of the sea which sends the remote signal to the control module; and
means for determining a travel time of the firing signal through the water.

15. The marine seismic data acquisition system of claim 14, wherein the seismoacoustic source generates the seismic signal by implosion.

16. The marine seismic data acquisition system of claim 14, wherein the seismoacoustic source generates the seismic signal by explosion.

17. The marine seismic data acquisition system of claim 14, wherein the receiver is an acoustic receiver and the transmitter is an acoustic transmitter.

18. The marine seismic data acquisition system of claim 14, wherein the transmitter is located on the offshore rig.

19. The marine seismic data acquisition system of claim 14, wherein the transmitter is located on a surface buoy.

20. The marine seismic data acquisition system of claim 19, further comprising a transmission link between the transmitter and an offshore rig.

21. The marine seismic data acquisition system of claim 14, wherein the control module further comprises a transmitter which communicates with one or more receivers on an offshore rig.

22. The marine seismic data acquisition system of claim 14, further comprising one or more seismoacoustic receivers located at or below the seabed.

23. The marine seismic data acquisition system of claim 22, wherein the seismoacoustic receivers are located in a well drilled below the seabed.

24. The marine seismic data acquisition system of claim 23, wherein the seismoacoustic receivers are carried by a tool disposed in the well.

25. The marine seismic data acquisition system of claim 24, wherein the tool is a drill string including a seismic measurement-while-drilling tool.

26. The marine seismic data acquisition system of claim 24, wherein the tool is a wireline tool.

27. The marine seismic data acquisition system of claim 14, wherein the control module and the seismoacoustic source module are positioned along a planned trajectory of a well.

28. The marine seismic data acquisition system of claim 14, wherein the seismoacoustic source module is spaced from the control module.

29. The marine seismic data acquisition system of claim 14, further comprising an anchor system for anchoring the control module and the seismoacoustic source module to the seabed.

30. The marine seismic data acquisition system of claim 29, wherein the control module is releasably coupled to the anchor system.

31. The marine seismic data acquisition system of claim 30, further comprising a floatation device coupled to the control module.

32. The marine seismic data acquisition system of claim 14, wherein the control module further includes a precision clock which determines when the seismoacoustic source is fired.

33. The marine seismic data acquisition system of claim 14, wherein the control module further includes a processor which processes received and transmitted signals.

34. The marine seismic data acquisition system of claim 14, wherein the control module further includes memory for storing data.

35. The marine seismic data acquisition system of claim 14, wherein the control module further comprises a hydrophone for measuring a signature of the seismic signal.

36. The marine seismic data acquisition system of claim 14, further comprising a hydrophone suspended from the surface of the sea for measuring the seismic signal.

* * * * *